US009055464B2

(12) United States Patent
Jonsson et al.

(10) Patent No.: US 9,055,464 B2
(45) Date of Patent: Jun. 9, 2015

(54) RLC DATA TRANSMISSION CONTROL BASED ON UE MEMORY CAPACITY

(75) Inventors: Anders Jonsson, Täby (SE); Christer Henriksson, Norsborg (SE)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 956 days.

(21) Appl. No.: 13/178,048

(22) Filed: Jul. 7, 2011

(65) Prior Publication Data

US 2013/0010705 A1    Jan. 10, 2013

(51) Int. Cl.
| | | |
|---|---|---|
| H04W 4/00 | (2009.01) | |
| H04W 28/02 | (2009.01) | |
| H04L 12/807 | (2013.01) | |
| H04W 88/08 | (2009.01) | |
| H04W 72/04 | (2009.01) | |
| H04W 28/18 | (2009.01) | |

(52) U.S. Cl.
CPC .......... *H04W 28/0205* (2013.01); *H04W 88/08* (2013.01); *H04W 72/04* (2013.01); *H04W 28/18* (2013.01); *H04L 47/27* (2013.01)

(58) Field of Classification Search
CPC ...... H04W 72/04; H04W 88/08; H04W 76/00
USPC ................................................. 370/329, 341
See application file for complete search history.

(56) References Cited

U.S. PATENT DOCUMENTS 6,278,691 B1 *   8/2001   Ohyama et al. ............... 370/235
7,123,617 B1 * 10/2006   Abrol ........................... 370/394

(Continued)

FOREIGN PATENT DOCUMENTS

EP         1648183 A1    4/2006
KR    20090029047 A     3/2009

(Continued)

OTHER PUBLICATIONS

3GPP TS 25.306 V10.0.0 (Sep. 2010); Technical Specification; 3rd Generation Partnership Project; Technical Specification Group Radio Access Network; UE Radio Access capabilities (Release 10).

(Continued)

*Primary Examiner* — Brandon Renner
*Assistant Examiner* — Kodzovi Acolatse
(74) *Attorney, Agent, or Firm* — Vincent J. Allen; Stephen Y. Liu; Carstens & Cahoon, LLP

(57) ABSTRACT

Data transmission with a wireless communication device which communicates over an air interface with a radio network is controlled by setting a radio link control (RLC) window size for a first logical connection established with the wireless communication device over the air interface, the RLC window size indicating a number of RLC protocol data units (PDUs), periodically estimating a total amount of memory available at the wireless communication device for storing RLC PDUs, and controlling transmission of RLC PDUs associated with the first logical connection to the wireless communication device based on the estimated total amount of memory available at the wireless communication device for storing RLC PDUs, or based on the RLC window size set for the first logical connection if the RLC window size limits the transmission of the RLC PDUs more than the estimated total amount of memory available at the wireless communication device.

14 Claims, 3 Drawing Sheets

(56) References Cited

U.S. PATENT DOCUMENTS

| | | |
|---|---|---|
| 2004/0047331 A1* | 3/2004 | Jang ............................ 370/346 |
| 2004/0114593 A1* | 6/2004 | Dick et al. ................... 370/389 |
| 2005/0157696 A1* | 7/2005 | Yamamoto ................... 370/349 |
| 2006/0013257 A1* | 1/2006 | Vayanos ....................... 370/473 |
| 2007/0268861 A1* | 11/2007 | Diachina et al. ............. 370/329 |
| 2008/0043619 A1* | 2/2008 | Sammour et al. ............ 370/231 |
| 2008/0232251 A1* | 9/2008 | Hirayama et al. ........... 370/235 |
| 2009/0034455 A1* | 2/2009 | Lee et al. ...................... 370/329 |
| 2009/0215456 A1 | 8/2009 | Chun et al. |
| 2011/0099545 A1 | 4/2011 | Lee et al. |
| 2011/0261146 A1* | 10/2011 | Kamath et al. ............. 348/14.08 |

FOREIGN PATENT DOCUMENTS

| | | |
|---|---|---|
| WO | 2004091130 A1 | 10/2004 |
| WO | 2008097544 A2 | 8/2008 |
| WO | 2009058078 A1 | 5/2009 |

OTHER PUBLICATIONS

3GPP TS 25.306 V6.2.0 (Jun. 2004); Technical Specification; 3rd Generation Partnership Project;Technical Specification Group Radio Access Network; UE Radio Access capabilities (Release 6).

3GPP TS 25.322 V10.0.0 (Dec. 2012); Technical Specification; 3rd Generation Partnership Project;Technical Specification Group Radio Access Network; Radio Link Control (RLC) protocol specification (Release 10).

3GPP TS 25.331 V10.0.0 (Jun. 2010); Technical Specification; 3rd Generation Partnership Project;Technical Specification Group Radio Access Network; Radio Resource Control (RRC); Protocol specification (Release 10).

* cited by examiner

RLC DATA TRANSMISSION CONTROL BASED ON UE MEMORY CAPACITY

FIELD OF TECHNOLOGY

The present application relates in general to RLC data transmission in a wireless communication network, and in particular to controlling RLC data transmission based on UE memory capacity.

BACKGROUND

In WCDMA (wideband code division multiple access) and HSPA (high speed packet access), the radio network (RN) system is responsible for configuring the RLC (radio link control) window sizes in the UE (user equipment) so that the memory capability of the UE is not exceeded. The RLC protocol (Layer 2) operates in one of three modes: transparent; unacknowledged; and acknowledged mode (AM). The RLC protocol performs segmentation/re-assembly functions and, in acknowledged mode, provides an assured mode delivery service by use of retransmission. The RLC protocol provides a service both for control signaling (the Signaling Radio Bearer or SRB for short) and for user data transfer (the Radio Bearer or RB for short).

At call setup, the buffer capacity of the UE is signalled to the RN and the RN uses the UE buffer capacity to determine what size RLC windows to set up in the acknowledged mode. Some conventional techniques distribute the UE memory capacity for each radio bearer equally and do not account for or otherwise consider the actual transmission activity associated with each configured RB.

A radio bearer (RB) is a logical connection with a UE over the radio air interface and corresponds to a single data stream. A procedure for establishing an RB is described in Technical Specification 3GPP TS 25.931 v 5.1.0. For example, a UMTS Terrestrial Radio Access Network (UTRAN) responds to radio access service requests by allocating resources needed to support a communication with a UE. One RB may support a speech connection, another bearer may support a video connection, and a third bearer may support a data packet connection. Each RB is associated with quality of service (QoS) parameters describing how the RN should handle the data stream.

As the number of RBs using RLC acknowledged mode in the UE increases, a conventional RN correspondingly decreases the window size for each supported RB. This results in a peak throughput which is significantly lower than possible since the RLC window is of primary importance to facilitate high user data bit rates. Another drawback with the conventional system of handling RLC window sizes as described above is that there is a need to store unique RLC window values for each RB leading to extensive tables if the system supports multiple RB combinations. Every newly added RB must be assigned a unique RLC window size which in turn must be added to the table. As the number of RB combinations that are supported by the RN increases over time, so to does the cost of updating and maintaining the RLC window size tables. A table based solution with fixed values as outlined above also adversely affects the peak throughput in that the RLC window sizes are typically set to low values in order to address the worst case scenario in which all windows are full leading to overly conservative RLC window settings and a loss of peak throughput.

SUMMARY

Embodiments described herein set the RLC window size for one or more logical connections such as a radio bearer (RB) to a sufficiently high value so that that the air interface transmission rate generally is not limited by RLC window size. RLC data transmission is controlled by estimating dynamic UE memory usage and controlling the amount of packet data transmitted to the UE based on the memory usage at the UE instead of RLC window size.

According to an embodiment of a method of controlling data transmission with a wireless communication device which communicates over an air interface with a radio network, the method includes: setting an RLC window size for a first logical connection established with the wireless communication device over the air interface, the RLC window size indicating a number of RLC protocol data units (PDUs); periodically estimating a total amount of memory available at the wireless communication device for storing RLC PDUs; and controlling transmission of RLC PDUs associated with the first logical connection to the wireless communication device based on the estimated total amount of memory available at the wireless communication device for storing RLC PDUs, or based on the RLC window size set for the first logical connection if the RLC window size limits the transmission of the RLC PDUs more than the estimated total amount of memory available at the wireless communication device.

According to an embodiment of a radio network node for controlling data transmission with a wireless communication device which communicates with the radio network node over an air interface, the radio network node includes one or more processing circuits operable to set an RLC window size for a first logical connection established with the wireless communication device over the air interface, the RLC window size indicating a number of RLC PDUs. The one or more processing circuits are further operable to periodically estimate a total amount of memory available at the wireless communication device for storing RLC PDUs and control transmission of RLC PDUs associated with the first logical connection to the wireless communication device based on the estimated total amount of memory available at the wireless communication device for storing RLC PDUs, or based on the RLC window size set for the first logical connection if the RLC window size limits the transmission of the RLC PDUs more than the estimated total amount of memory available at the wireless communication device.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
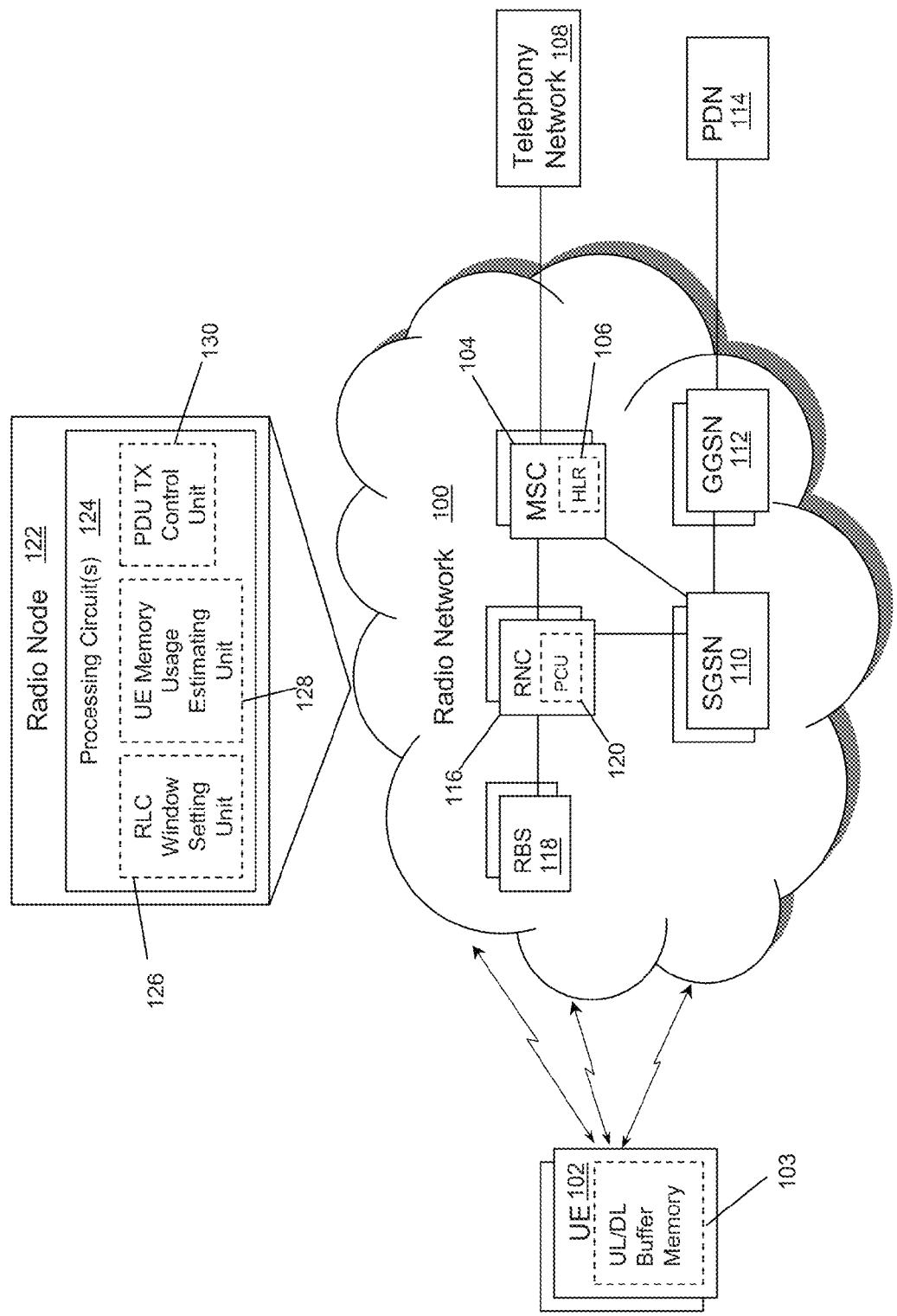
FIG. 1 illustrates an embodiment of a radio network.

FIG. 1 schematically illustrates an embodiment of a WCDMA/HSPA-based radio network 100 which services UEs 102. In the circuit-switched domain, a mobile services center (MSC) server 104 forms part of the control layer. The MSC server 104 includes a home location register (HLR) 106 and manages voice-communications with a telephony network 108. In the packet-switched domain, a serving GPRS support node (SGSN) 110 and a gateway GPRS support node (GGSN) 112 form part of the connectivity layer and contain both control functionality and functionality for providing IP connectivity. The GGSN 112 provides an interface to one or more external networks 114 such as the Internet, corporate local areas networks (LANs), etc. The radio network 100 also includes a radio network controller (RNC) 116 for managing radio resources. The RNC 116 controls the radio base stations (RBS) 118 of the radio network 100, which provide radio resources to the UEs 102. The RNC 116 includes a packet control unit (PCU) 120 for handling GPRS packets. The PCU 120 manages the radio link control (RLC) and medium access control (MAC) layers over the air interface, and the transfer of user data packets between the UEs 102 and the SGSN 110. Alternatively, the radio network 100 is based on LTE instead of a WCDMA/HSPA and for example has an eNodeB (enhanced NodeB) instead of the RNC 116 and RBSs 118. The embodiments described herein are also equally applicable to any other radio system using a window controlled retransmission protocol such as EDGE (enhanced data rates for GSM evolution), CDMA2000, WLAN (wireless local area network), etc.

Figure 2:
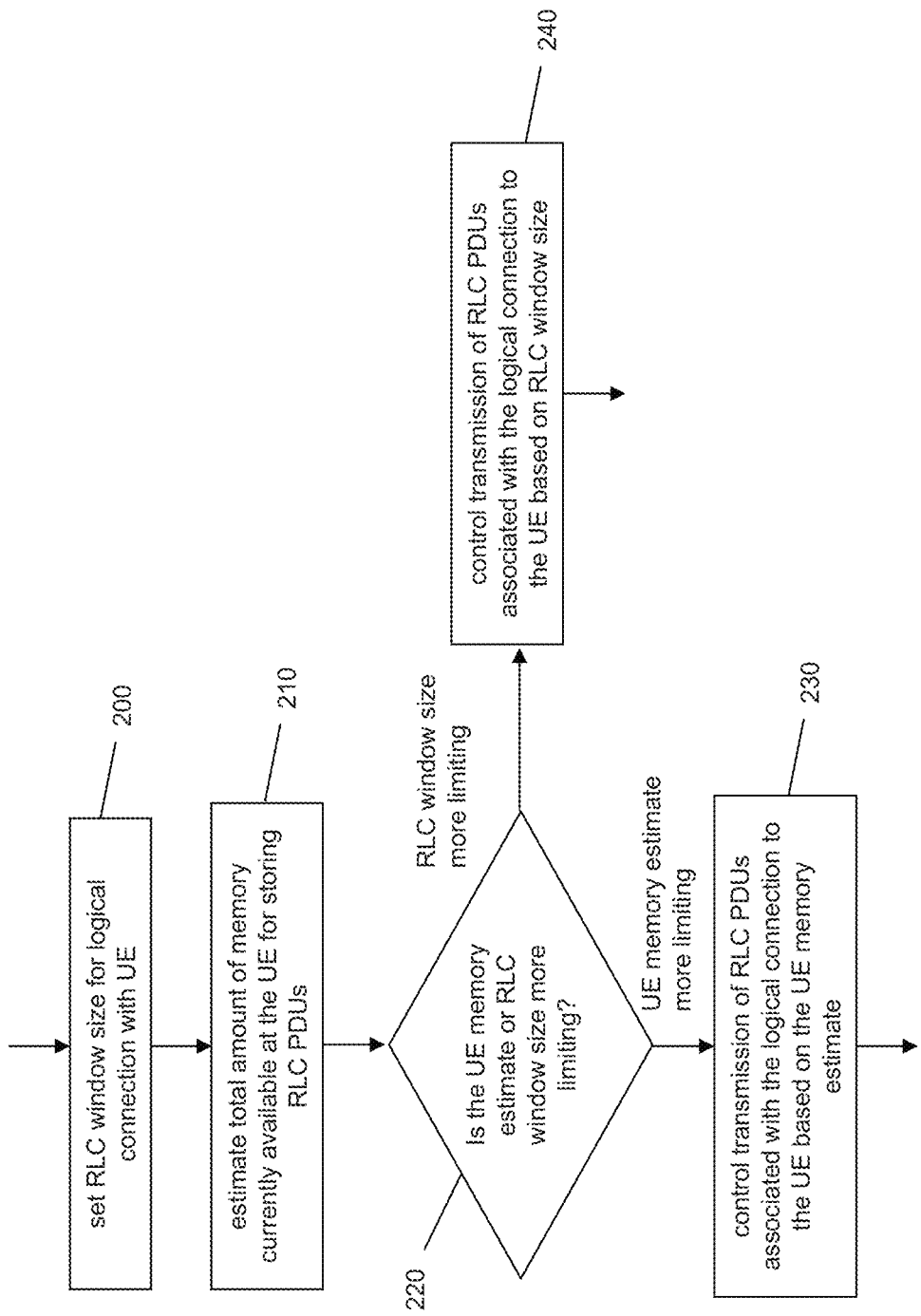
FIG. 2 illustrates an embodiment of a method of controlling data transmission with a wireless communication device which communicates over an air interface with a radio network.

In each case, the radio network 100 includes a radio node 122 having one or more processing circuits 124 which can include any type of hardware and/or software suitable for implementing the program logic illustrated in FIG. 2. For example, the processing circuit(s) 124 may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof. In addition, the radio node 122 may be any node within the radio network 100 which manages RLC data transmissions. For example, the radio node 122 may be the RNC 116 or RBSs 118 for a WCDMA/HSPA network or an eNodeB for an LTE network. In each case, the radio node 122 controls data transmission with the UEs 102 over the air interface.

Each UE 102 has a buffer memory 103 for storing RLC protocol data units (PDUs) associated with uplink (UL) and downlink (DL) packet-based communication with the radio network 100. A different logical connection such as a radio bearer (RB) is established with a particular UE 102 through the radio network 100 over the radio air interface for each separate data stream. In the DL direction, the radio network 100 sends RLC PDUs associated with a particular logical connection to the UE 102. The UE 102 sends RLC PDUs to the radio network 100 in the UL direction. In each case, the UE 102 typically has a relatively small memory 103 for buffering incoming and outgoing RLC PDUs. In the RLC acknowledged mode, PDUs typically remain in the UE memory 103 until acknowledged or dropped.

To support the RLC PDU transmission process, the radio node 122 includes an RLC window setting unit 126 included in or associated with the one or more processing circuits which sets the RLC window size for each logical connection for which the UE is configured (Step 200). The RLC window size indicates a certain number of RLC PDUs. In conventional systems, RLC PDUs associated with this logical connection (and all other logical connections) are transmitted based on the RLC window size which is typically set to an arbitrary number based merely on the number of configured logical connections. As such, data transmissions to the UE 102 are conventionally throttled (stalled) when the sequence number associated with the next RLC PDU to be transmitted falls outside the RLC window size even if the UE memory 103 has sufficient capacity to store the RLC PDU, resulting in an inefficient use of the UE memory buffer 103.

The radio node 122 described herein enables a more efficient utilization of the UE memory buffer 103. To this end, the radio node 122 further includes a UE memory usage estimating unit 128 and a PDU transmission control unit 130 included in or associated with the processing circuit(s) 124 of the radio node 122. The UE memory usage estimating unit 128 periodically estimates the total amount of memory available at the UE 102 for storing RLC PDUs (Step 210). The UE memory capacity estimate can be periodically estimated at recurring intervals of time e.g. at regular intervals, or at irregular or intermittent intervals. In each case, the UE memory capacity estimate is dynamic instead of being calculated only once and not updated or otherwise re-calculated. The RNC 116 determines whether the UE memory capacity estimate or the RLC window size is more limiting on the transmission of RLC PDUs for the corresponding logical connection to the UE 102 (Step 220). The RLC window size is more limiting on the transmission of RLC PDUs for the logical connection than the UE memory capacity estimate if controlling transmission of RLC PDUs based on the UE memory capacity estimate would result in transmission of one or more RLC PDUs outside of the RLC window size. For example in the case of a single RB and a streaming media application, the RLC window size set for the RB may indicate a possible buffer overrun condition at the UE 102 before the UE memory capacity estimate does. In other cases, the UE memory capacity estimate indicates a likely buffer overrun condition at the UE 102 before the RLC window size does.

The PDU transmission control unit 130 controls the transmission of RLC PDUs associated with this logical connection to the UE 102 based on the estimated total amount of memory available at the UE 102 for storing RLC PDUs, unless the UE memory capacity estimate is more limiting on the transmission of the RLC PDUs as described above (Step 230). If however the RLC window size limits the transmission of the RLC PDUs more than the UE memory capacity estimate, the PDU transmission control unit 130 controls the transmission of PDUs to the UE 102 based on the RLC window size set for the logical connection (Step 240). This way, the transmission of RLC PDUs to the UE 102 is not arbitrarily throttled or stalled based on the RLC window size. Instead the radio node 122 throttles the transmission of RLC PDUs to the UE 102 if either the UE memory capacity or RLC window size indicates a possible overflow condition at the UE 102, better utilizing the UE buffer memory 103.

Not all logical connections for which the UE 102 is configured need to be handled the same way. For example, one or more other logical connections can be handled in a more conventional manner. In one embodiment, the RLC window setting unit 126 of the radio node 122 sets the RLC window size for a different logical connection such as a signalling radio bearer (SRB) to a relatively small number and the PDU transmission control unit 130 of the radio node 122 controls the transmission of RLC PDUs associated with this other logical connection to the UE 102 based on the RLC window size set for the logical connection. This way, the UE memory usage estimating unit 128 of the radio node 122 need not perform dynamic memory usage estimates for all logical connections according to this embodiment, but for only a subset of the logical connections.

Figure 3:
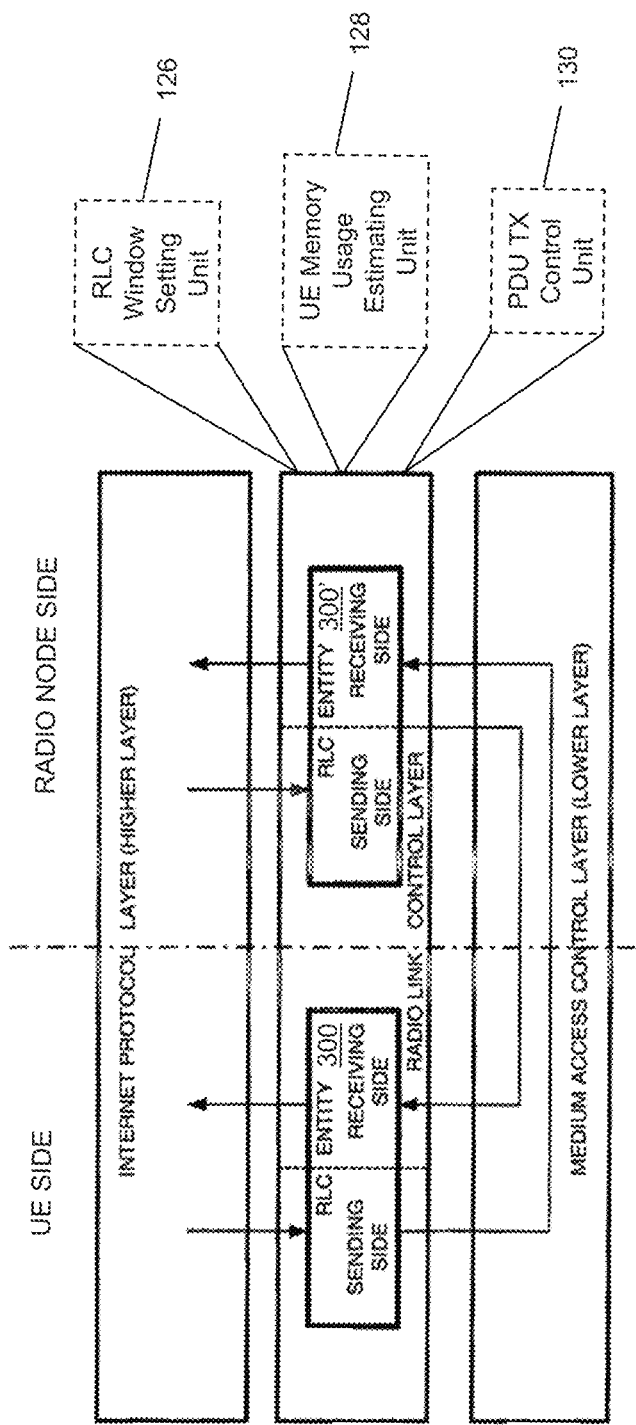
FIG. 3 illustrates the RLC layer implemented between a wireless communication device and a radio network for supporting RLC data transmissions.

FIG. 3 shows the RLC layer in more detail as implemented between the radio network 100 and the UE 102. The RLC layer transmits and receives RLC PDUs via the MAC layer. In the illustrative example of FIG. 3, the MAC layer functions as a lower layer in the protocol stack relative to the RLC layer. The higher layer can be a layer such as TCP/IP (e.g., IP layer). The MAC layer maps between logical channels and transport channels, provides priority handling and scheduling of data flows on transport channels, among other things.

A logical connection such as a radio bearer (RB) is established for each service. At least one RLC entity 300, 300' is established in both the UE 102 and the radio node 122 for each logical connection. In the case of acknowledged mode (AM) RLC, one RLC entity 300 is provided in the UE 102 and one RLC entity 300' is provided in the radio node 122. Each RLC entity 300, 300' has a transmitting (sending) side and a receiving side associated with the lower layer (e.g. the MAC layer). The RLC protocol supports the in-sequence delivery of higher level service data units (SDUs) such as TCP/IP packets. The RLC window setting unit 126, memory usage estimating unit 128 and PDU transmission control unit 130 of the radio node 122 interact with the RLC layer so that the transmission of PDUs to the UE 102 in most cases is based on an estimate of the total memory available at the UE for storing RLC PDUs and not the RLC window size previously set for the corresponding logical connection, as described above. If however the RLC window size limits the transmission of the RLC PDUs more than the estimated total amount of memory available at the UE 102, the PDU transmission control unit 130 controls the transmission of PDUs to the UE 102 based on the RLC window size set for the corresponding logical connection. This ensures highly efficient use of the UE memory buffer 103 with few or no buffer overrun conditions. In the event of a buffer overrun condition, the UE 102 may discard data that cannot be buffered and initiate a corresponding retransmission request procedure as is well known in the art. In one embodiment, the UE implements 3GPP change request RP-041243 and is therefore compliant with the 3GPP specification TS25.306 version 6.2.0 or later concerning UE buffer memory handling in order to handle the RLC window sizes and sending of RLC AM (acknowledged mode) data to the UE 102 as described herein. Of course the UE 102 may implement other standards or quasi-standards, depending on the underlying radio network technology, concerning UE buffer memory handling in order to handle the RLC window sizes and sending of RLC AM data to the UE 102 as described herein.

In one embodiment, the radio node 122 sets up each logical connection with an RLC window size corresponding to half the sequence number (SN) number space for both the transmitting and receiving AM RLC entities 300, 300' in both the UL and DL directions. With a 12 bit SN number space, this means that the RLC window size is set to 2047. This ensures that all logical connections have the potential to transmit as high a rate as possible on the RLC protocol layer, and therefore the air interface transmission rate is not limited by the RLC layer.

The radio node 122 can store the UE buffer memory capability as signalled e.g. in the RB setup complete message sent over the RRC (radio resource control) protocol layer, and use this information to estimate how much data can be transmitted to the UE 102 as determined by the MAC layer. The amount of data that can be transmitted to the radio network 100 from the UE 102 for each $RB_j$ corresponds to the minimum of a capacity allocation ($CA_j$) and $M_j$, where:

n=Number of Radio Bearers (RB)
m=Total number of RLC PDU's UE needs to store
$m_j$=Number of RLC PDU's UE needs to store for $RB_j$
$CA_j$=Capacity allocation for $RB_j$
$b_i$=Number of bits for RLC $PDU_i$
$M_t$=Total amount of UE memory used to store data for all RB
$M_j$=Memory consumed in UE to store data for $RB_j$
$M_b$=Buffer memory capability of UE The buffer memory 103 used by $RB_j$ can be estimated by the UE memory usage estimating unit 128 as given by:

$$M_j = \sum_{i=1}^{m_j} b_i \quad (1)$$

Alternatively, the UE memory usage estimating unit 128 calculates the UE memory usage estimate as given by:

$$M_j = m_j \times s_i \quad (2)$$

Where $s_i$=Maximum RLC PDU size in bits

The alternative method represented by equation (2) for calculating $M_j$ may be used with complete accuracy for a fixed size RLC, but provides a conservative maximum value for a flexible RLC size since in the latter case the actual RLC PDU size may vary but is always smaller than $s_i$.

The UE memory usage estimate $M_j$ calculated by the radio node 122 may also be limited by so-called flow control functionality which restricts how much data can be sent from the SNRC to the RBSs over a given time period is not exceeded. Thus when $M_j$ has been calculated for each $RB_j$ to the desired level of accuracy and possible flow control related restrictions are applied, then the total UE memory consumption estimate $M_t$ may be calculated by the UE memory usage estimating unit 128 as given by:

$$M_t = \sum_{i=1}^{n} M_i \quad (3)$$

The actual amount of memory that the UE 102 needs to store RLC PDUs may be calculated with the method described above. In one embodiment, the radio node 122 can prevent the buffer memory capability of the UE 102 from being exceeded by ensuring that the following condition is fulfilled:

$$M_t \leq M_b \quad (4)$$

where $M_b$ is either the buffer memory capacity as reported by the UE 102 or a calculated value compensated for RLC header overhead and/or MAC level memory consumption such as memory needed to store MAC-hs data. If there are a plurality of RBs used in parallel, then the radio node 122 can ensure the condition given by equation (4) is fulfilled either by reducing the number of RLC PDUs sent on all logical connections or on a subset of the logical connections such as on one RB.

According to one embodiment, the PDU transmission control unit 130 of the radio node 122 delays the transmission of RLC PDUs of a lower priority traffic type before delaying the transmission of RLC PDUs of a higher priority traffic type in order to satisfy equation (4). One such prioritization scheme is to ensure that the sum of all RLC PDUs that are sent in a given time interval, $$m = \sum_{j=1}^{n} m_j,$$

contains in descending order of priority, control signalling data such as signalling radio bearer (SRB) traffic, followed by voice and streaming data, interactive high priority data, background interactive data etc. As such $m=\Sigma m_1+m_2+m_3+m_4+m_5 \ldots m_j$ where:

$m_1$=Number of RLC PDU's consumed by SRB data
$m_2$=Number of RLC PDU's consumed by streaming data
$m_3$=Number of RLC PDU's consumed by interactive high prio data
$m_4$=Number of RLC PDU's consumed by background data
$m_5$=Number of RLC PDU's consumed by packet voice data
$m_j$=Number of RLC PDU's consumed by lowest priority data This prioritization scheme could benefit by making use of a quality of service (QoS) mapping data since this is typically stored in the radio network 100 and sent to the scheduling function residing in the RBSs 118. The actual selection of data to make up m may also be influenced by flow control functionality, an example being that lower priority data can sometimes be included even though higher priority data is available in order to fulfil QoS requirements such as minimum bit rate.

Memory consumption $M_t$ in the UE 102 varies over time due to the amount of RLC retransmissions for the logical connections configured for the UE. The number of RLC PDUs $m_j$ that need to be stored for $RB_j$ in the UE memory 103 can be calculated by the UE memory usage estimating unit 128 for WCDMA/HSPA type transmissions using the RLC sequence numbers as given by:

$$m_j = VT_j(S) - VT_j(A) \qquad (5)$$

where:
$VT_j(S)$=Sequence Number of the next RLC PDU to be transmitted on $RB_j$ for the first time.
$VT_j(A)$=Sequence Number following the last in-sequence acknowledged RLC PDU on $RB_j$.
and the RLC AM parameters $VT_j(S)$ and $VT_j(A)$ are defined in the WCDMA/HSPA 3GPP specification TS 25.322 for RLC.

The above method allows the radio node 122 to calculate the number of RLC PDUs $m_j$ that may be sent for each of n RBs while still ensuring that the UE buffer memory capacity $M_b$ is not exceeded by ensuring that no more than data up to sequence number $VT_j(S)$ is sent to the UE 102 for each $RB_j$. This may be done either according to a first method of assuming a set value for all outstanding RLC PDUs sent up to VT(S) for each of the n RBs or alternatively by adding the actual RLC PDU sizes of all RLC PDUs exceeding VT(A) up to VT(S) for each of the n RBs to ensure that the total amount of data sent to the UE 102 does not exceed $M_b$.

In one embodiment, a dynamic calculation in both the UL and DL directions is used. This means that $M_t$ in equation (4) is calculated according to equation (3) for all RBs in both UL and DL directions. In one particular embodiment of calculating the uplink part of $M_t$, the radio node 122 estimates $M_t$ by summing up the amount of data contained in the received uplink RLC PDUs following the last in-sequence acknowledged RLC PDU in the DL status reports sent to the UE 102 for each $RB_j$. In this case $VT_j(S)$ for the UE 102 is estimated to be the SN (sequence number) of the last received uplink RLC PDU and $VT_j(A)$ is assumed to be the SN following the last in-sequence acknowledged RLC PDU in the last DL status reports sent to the UE 102. This approach yields a slight underestimate of the amount of data that needs to be buffered in the UE 102 for the UL since this method does not factor in the delay before the UE 102 receives and processes the status report, or the data already sent from the UE 102 but not yet received at the time the estimate is calculated in the radio node 122. This estimate can then either be used as is, which yields a slight underestimate. Alternatively, a correction factor can applied which addresses the above-mentioned factors. The correction factor can be applied by adding an estimate of the product of the RLC bitrate and the RLC round trip time (RTT) to the UE memory usage estimate.

According to another embodiment, the dynamic memory calculation described above is used for one direction and a fixed estimate is used for the memory consumption associated with the complementary direction. For example, a dynamic calculation of the DL data sent by the radio network 100 can be provided and a fixed estimate can be applied for the data sent on the UL by the UE 102. In this case the UL memory consumption can be estimated as the amount of data sent by the UE 102 in between the DL RLC status reports. This estimate can thus be calculated as the product of the DL timer status prohibit and the estimated RLC bit rate.

In yet another embodiment, the calculation according to equation (3) is limited to a subset of the RBs and a simplified or fixed memory consumption is assumed for the other RBs such as signalling radio bearers (SRBs). For example, the calculation according to equation (3) is performed by the radio node 122 for high bit rate interactive and streaming RBs while a fixed deduction based on the product of the timer status prohibit and the estimated RLC bit rate is made for low bit rate services such as packet speech. The rationale for applying a scheme excluding one direction and/or certain logical connections from a more detailed calculation is that they do not contribute sufficiently to the UE memory consumption to merit the expenditure in processing required to do a more detailed calculation e.g. in accordance with equation (3).

Some UEs 102 may implement a buffer memory handling procedure that requires all RLC PDUs that make up an RLC SDU to be acknowledged before the UE 102 can free up memory for more data. This also leads to a slight underestimate of $M_t$ unless the radio node 122 implements a slightly more complex approach that bases the UE memory usage calculation on acknowledgements of complete RLC SDUs instead of RLC PDUs. However, while the radio node 122 can attempt to ensure equation (4) is always fulfilled where $M_t$ is the sum of an estimate of the memory consumed by both the UL and DL RBs, if the buffer memory capability of the UE 102 is temporarily exceeded for some reason, such as slight inaccuracies in the method used to arrive at an estimate of $M_t$, this does not have a serious impact and merely leads to an increase of RLC retransmissions since the UE 102 is allowed to discard data under these circumstances. This consequently leads to a temporary degradation of throughput while this condition persists and until the radio node 122 has managed to reduce the UE buffer load so that condition (4) is fulfilled again.

One embodiment to handle this situation is for the PDU transmission control unit 130 of the radio node 122 to stop or otherwise throttle transmissions of new DL data e.g. in the order of priority as outlined previously herein. That is, the radio node 122 can first limit the transmission of DL RLC PDUs of the lowest priority and continue to limit RLC PDUs of progressively higher order of priority as needed until equation (4) is fulfilled again.

The embodiments described herein yield improved throughput characteristics, particularly for cases where the UE 102 uses a number of logical connections (e.g. RBs) at the same time. This is especially apparent if the UE 102 has a limited buffer memory capability. Also, an increase in user and cell throughput results especially for UEs 102 with a low buffer memory capability in multiple RB scenarios since the UE memory 103 can be used more effectively in accordance with the RLC window configuration schemes described herein. Furthermore, no RRC RB reconfiguration messages due to changes of the RLC window size need to be sent when RBs are added or removed. This is beneficial since RB reconfigurations add to the risk of a dropped call.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A radio network node for controlling data transmission with a wireless communication device which communicates with the radio network node over an air interface, the radio network node comprising one or more processing circuits operable to:
   set a radio link control (RLC) window size for a first logical connection established with the wireless communication device over the air interface, the RLC window size indicating a number of RLC protocol data units (PDUs);
   periodically estimate a total amount of memory available at the wireless communication device for storing RLC PDUs; and
   controlling transmission of RLC PDUs associated with the first logical connection to the wireless communication device based on the estimated total amount of memory available at the wireless communication device for storing RLC PDUs, or based on the RLC window size set for the first logical connection if the RLC window size limits the transmission of the RLC PDUs more than the estimated total amount of memory available at the wireless communication device; and wherein the one or more processing circuits are operable to:
   estimate the total amount of memory available at the wireless communication device for storing RLC PDUs by calculating a memory usage estimate for the wireless communication device;
   estimate uplink memory usage at the wireless communication device by summing up an amount of data contained in received uplink RLC PDUs following a last in-sequence acknowledged RLC PDU in a downlink status report sent to the wireless communication device; and
   apply a correction factor to the memory usage estimate which accounts for at least one of delay that occurs before the wireless communication device receives and processes the downlink status report and delay associated with RLC PDUs which are sent by the wireless communication device and not received and processed by the radio network before the memory usage estimate is calculated.

2. The radio network node of claim 1, wherein the one or more processing circuits are operable to calculate a dynamic downlink estimate and a fixed uplink estimate of the memory usage at the wireless communication device.

3. The radio network node of claim 2, wherein the one or more processing circuits are operable to calculate the fixed uplink estimate based on an amount of data transmitted by the wireless communication device between downlink RLC status reports sent by the radio network.

4. The radio network node of claim 1, wherein the one or more processing circuits are operable to estimate dynamic downlink memory usage at the wireless communication device as a function of a sequence number of the next RLC PDU to be transmitted to the wireless communication device and the sequence number of the last in-sequence RLC PDU acknowledged by the wireless communication device for the first logical connection.

5. The radio network node of claim 4, wherein the one or more processing circuits are operable to use a fixed set size for all of the RLC PDUs between the two sequence numbers to estimate the memory usage at the wireless communication device.

6. The radio network node of claim 1, wherein the one or more processing circuits are operable to add an estimate of the product of RLC uplink bitrate and RLC round trip time to the memory usage estimate to apply the correction factor.

7. The radio network node of claim 1, wherein the one or more processing circuits are operable to delay transmission of RLC PDUs of a lower priority traffic type instead of RLC PDUs of a higher priority traffic type if an estimated total amount of memory needed at the wireless communication device for storing RLC PDUs exceeds the estimated total amount of memory available at the wireless communication device or a predefined portion of the estimated total amount of memory available at the wireless communication device.

8. The radio network node of claim 1, wherein the one or more processing circuits are operable to maintain a fixed RLC window size for the first logical connection responsive to a new logical connection being established with the wireless communication device or another existing logical connection being terminated.

9. The radio network node of claim 8, wherein the one or more processing circuits are operable to set the fixed RLC window size based on a sequence number space used by the radio network to number each byte in a transmission stream sent to the wireless communication device for the first logical connection, wherein the sequence number space is 12 bits and the fixed RLC window size is set to 2047.

10. The radio network node of claim 1, wherein the one or more processing circuits are further operable to set the RLC window size for a second logical connection established with the wireless communication device over the air interface and control transmission of RLC PDUs associated with the second logical connection to the wireless communication device based on the RLC window size set for the second logical connection.

11. The radio network node of claim 10, wherein the second logical connection is a signalling radio bearer.

12. The radio network node of claim 1, wherein the one or more processing circuits are operable to set the RLC window size for the first logical connection large enough so that the air interface transmission rate is not limited by the RLC layer.

13. The radio network node according to claim 1, wherein the one or more processing circuits are further operable to maintain the RLC window size for the first logical connection even though the RLC window sizes in total for all logical connections established with the wireless communication device exceed a total memory capacity of the wireless communication device.

14. The radio network node of claim 1, wherein the one or more processing circuits are operable to maintain the RLC window size for the first logical connection responsive to a new logical connection being established with the wireless communication device or another existing logical connection being terminated.

* * * * *